(12) United States Patent
Takagi

(10) Patent No.: US 10,865,742 B2
(45) Date of Patent: Dec. 15, 2020

(54) EVAPORATED FUEL PROCESSING DEVICE

(71) Applicant: DENSO CORPORATION, Kariya (JP)

(72) Inventor: Kosei Takagi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/669,776

(22) Filed: Oct. 31, 2019

(65) Prior Publication Data

US 2020/0141360 A1    May 7, 2020

(30) Foreign Application Priority Data

Nov. 6, 2018    (JP) .................................. 2018-208689

(51) Int. Cl.
*F02M 25/08*    (2006.01)
*B60K 15/03*    (2006.01)
*F02D 41/00*    (2006.01)

(52) U.S. Cl.
CPC ......... *F02M 25/0818* (2013.01); *B60K 15/03* (2013.01); *F02D 41/003* (2013.01); *F02M 25/0809* (2013.01); *F02M 25/0836* (2013.01); *F02M 25/0854* (2013.01); *B60K 2015/0319* (2013.01); *B60K 2015/0321* (2013.01); *F02M 2025/0845* (2013.01)

(58) Field of Classification Search
CPC ....... B60K 2015/0319; F02M 25/0809; F02M 25/0818; F02M 25/0836
USPC .................. 123/518, 519; 73/40.5 R, 114.39
See application file for complete search history.

(56) References Cited

U.S. PATENT DOCUMENTS

| | | | | |
|---|---|---|---|---|
| 9,476,793 B2 * | 10/2016 | Takakura | ............ | G01M 3/2876 |
| 10,184,430 B2 * | 1/2019 | Watanabe | .......... | F02M 25/0818 |
| 10,352,260 B2 * | 7/2019 | Tochihara | ............... | F02D 41/22 |
| 10,683,830 B2 * | 6/2020 | Ooiwa | ............... | F02M 25/0836 |
| 2012/0186333 A1 * | 7/2012 | Nishimura | .......... | G01M 3/3263 |
| | | | | 73/40.5 R |
| 2013/0319378 A1 * | 12/2013 | Haag | ................ | B60K 15/03504 |
| | | | | 123/519 |
| 2015/0013437 A1 * | 1/2015 | Takakura | ........... | F02M 25/0818 |
| | | | | 73/40.5 R |
| 2015/0096355 A1 * | 4/2015 | Makino | .............. | F02M 25/0836 |
| | | | | 73/40.7 |
| 2018/0238273 A1 * | 8/2018 | Maegawa | ............... | F02D 41/22 |
| 2019/0041292 A1 * | 2/2019 | Ishihara | ........... | B60K 15/03504 |

\* cited by examiner

*Primary Examiner* — Erick R Solis
(74) *Attorney, Agent, or Firm* — Nixon & Vanderhye PC

(57) ABSTRACT

An evaporated fuel processing device is configured to collect evaporated fuel from a fuel tank of an internal combustion engine. The evaporated fuel processing device includes the fuel tank, a canister, a tank sealing valve, a switching valve, and a differential pressure sensor. The fuel tank stores fuel for the internal combustion engine. The canister adsorbs evaporated fuel generated in the fuel tank. The switching valve switches between allowing and blocking off communication between the canister and open air. The differential pressure sensor detects a system differential pressure between the pressure on the canister side of the tank sealing valve and the pressure on the fuel tank side of the tank sealing valve in the detection target system.

11 Claims, 9 Drawing Sheets

EVAPORATED FUEL PROCESSING DEVICE

CROSS REFERENCE

The present application is based on Japanese Patent Application No. 2018-208689 filed on Nov. 6, 2018, the disclosure of which is incorporated herein by reference.

TECHNICAL FIELD

The present description relates to an evaporated fuel processing device.

BACKGROUND

In an evaporated fuel processing device that processes evaporated fuel generated in a fuel tank of an internal combustion engine, a diagnostic device may diagnose evaporated fuel leakage from the device.

SUMMARY

According to one aspect of the present disclosure, an evaporated fuel processing device for recovering evaporated fuel from a fuel tank of an internal combustion engine includes the fuel tank which stores fuel, a canister that adsorbs the evaporated fuel generated in the fuel tank, a tank sealing valve that switches between allowing and blocking communication between the fuel tank and the canister, a switching valve that switches between allowing and blocking communication between the canister and open air, and a differential pressure sensor configured to detect a system differential pressure of a detection target system including the canister and the fuel tank, the system differential pressure being a pressure difference between a pressure on the canister side of the tank sealing valve and a pressure on the fuel tank side of the tank sealing valve.

DETAILED DESCRIPTION

Figure 1:
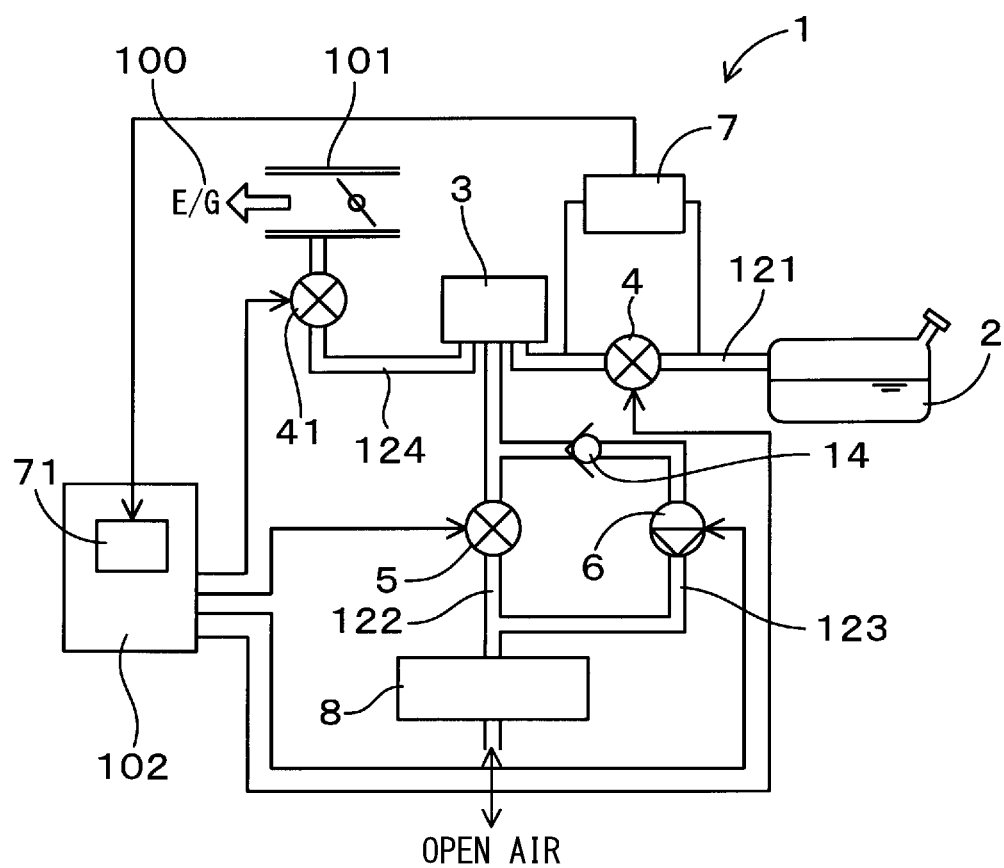
FIG. 1 is view showing the configuration an evaporated fuel processing device.

An evaporated fuel processing device according to a first embodiment will be described with reference to FIGS. 1 and 2.

The evaporated fuel processing device 1 of the present embodiment is configured to collect evaporated fuel from a fuel tank 2 of an internal combustion engine 100. The evaporated fuel processing device 1 includes the fuel tank 2, a canister 3, a tank sealing valve 4, a switching valve 5, and a differential pressure sensor 7.

The fuel tank 2 stores fuel for the internal combustion engine 11.

The canister 3 adsorbs evaporated fuel generated in the fuel tank 2.

The tank sealing valve 4 switches between allowing and blocking off communication between the fuel tank 2 and the canister 3.

The switching valve 5 switches between allowing and blocking off communication between the canister 3 and open air (e.g. open atmosphere).

The differential pressure sensor 7 is applied to a detection target system including the canister 3 and the fuel tank 2. Specifically, the differential pressure sensor 7 detects a system differential pressure $\Delta P$ in the detection target system between the pressure on the canister side of the tank sealing valve 4 and the pressure on the fuel tank side of the tank sealing valve 4.

Hereinafter, the evaporated fuel processing device 1 of the present embodiment will be described in detail.

As shown in FIG. 1, the fuel tank 2 and the canister 3 are connected to each other via an evaporated fuel passage 121. That is, the evaporated fuel evaporated in the fuel tank 2 reaches the canister 3 through the evaporated fuel passage 121 connected to the top of the fuel tank 2. The tank sealing valve 4 is provided in the evaporated fuel passage 121. The communication state of the tank sealing valve 4 is controlled by an ECU (electronic control unit) 102 of the internal combustion engine 100. In the present embodiment, the ECU 102 is a processor including a CPU and memory, but in alternative embodiments, the ECU 102 may be implemented partially or wholly as hard logic, field programmable logic gates, or other controller elements.

In the present embodiment, as shown in FIG. 1, the differential pressure sensor 7 is provided in the evaporated fuel passage 121. The differential pressure sensor 7 is connected to the upstream side and the downstream side of the tank sealing valve 4 in the evaporated fuel passage 121. As a result, the differential pressure sensor 7 is configured to detect the system differential pressure $\Delta P$ of the detection target system, which is the pressure difference between the tank-side region (or area) on the fuel tank 2 side of the tank sealing valve 4 and the canister-side region (or area) on the canister 3 side of the tank sealing valve 4. Further, in the present embodiment, the system differential pressure $\Delta P$ may be appropriately distinguished as $\Delta P1$, $\Delta P2$, $\Delta P3$, $\Delta P4$, etc., depending on the detection timing of the differential pressure sensor 7.

As shown in FIG. 1, a purge passage 124 is connected to the canister 3. The purge passage 124 allows communication between the canister 3 and an intake system 101 of the internal combustion engine 100. The purge passage 124 is provided with a purge valve 41. The purge valve 41 is configured to turn on and off to control supply of the evaporated fuel from the canister 3 to the intake system 101, i.e., by opening and closing the purge passage 124.

The canister 3 is connected to a vent passage 122 for introducing open air. A switching valve 5 is provided in the vent passage 122. The vent passage 122 is provided with a bypass passage 123 for bypassing the switching valve 5.

In the present embodiment, a pump 6 is provided. In the detection target system, which includes the canister 3 and the fuel tank 2, the pump 6 is arranged on the open air side of the canister 3 and is configured to pressurize and depressurize the detection target system. In the present embodiment, the pump 6 is provided in the bypass passage 123. Further, the bypass passage 123 is provided with a check valve 14. Due to this, the air is discharged from the canister 3 to the open air side. Then, the detection target system including both the canister 3 and the fuel tank 2 can be switch into a closed system by closing the purge valve 41 and the switching valve 5. The check valve 14 prevents pressure from escaping through gaps in the pump 6 after pressure is reduced by the pump 6.

In the present embodiment, this closed system is the detection target system. In this case, by closing the purge valve 41 and the switching valve 5 and opening the tank sealing valve 4 so that the fuel tank 2 and the pump 6 are in communication with each other, the pump 6 may be operated to pressurize or depressurize the closed system. As a result, the pressure in the detection target system can be reduced. Thereafter, by closing the tank sealing valve 4, the tank-side region and the canister-side region in the detection target system can be independently sealed in a negative pressure state. In the present embodiment, the purge valve 41, the tank sealing valve 4, and the switching valve 5 are all constituted by electromagnetic valves.

A leakage diagnosis unit 71 shown in FIG. 1 detects leaks in the detection target system based on the detection value of the differential pressure sensor 7 after the pump 6 pressurizes or depressurizes the detection target system, i.e., based on the change in the system differential pressure $\Delta P$. The leakage diagnosis unit 71 is a software module, i.e., a program that when executed by the ECU 102 of the internal combustion engine 100, causes the ECU 102 to perform the various functions of the leakage diagnosis, including controlling the various valves and reading values from various sensors.

Figure 6:
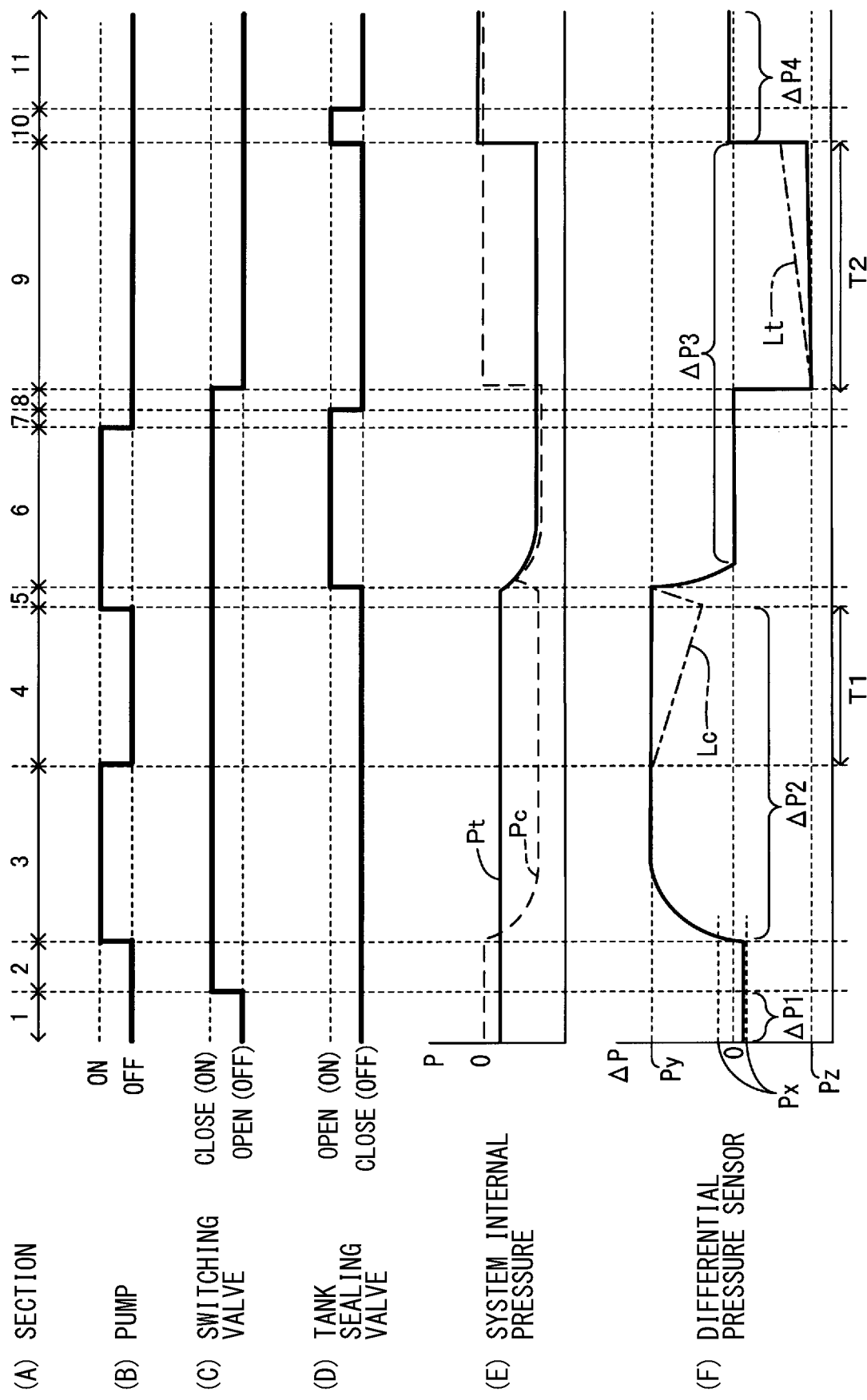
FIG. 6 is a timing chart.
Figure 7:
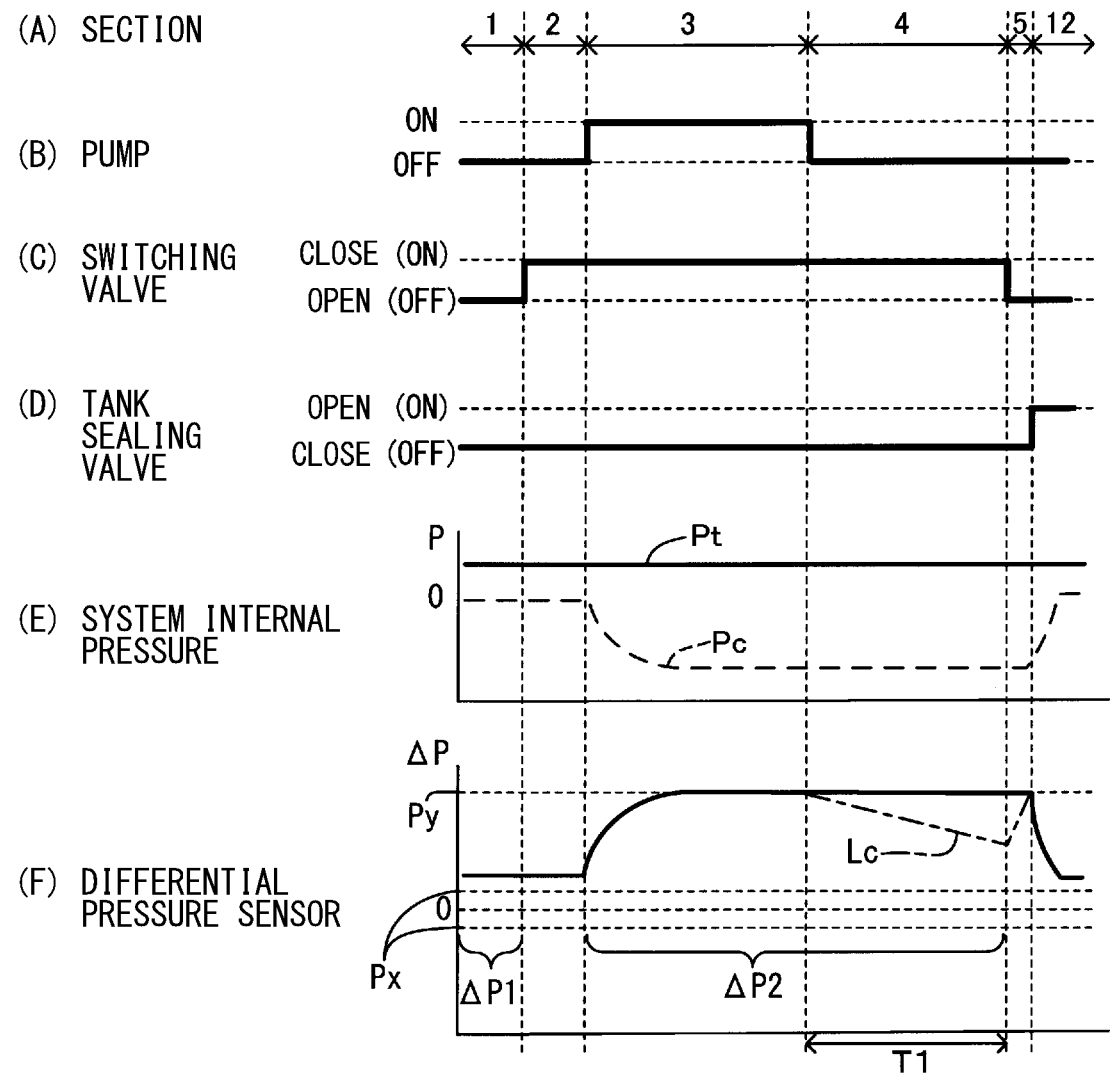
FIG. 7 is a timing chart.

The leakage diagnosis in the leakage diagnosis unit 71 will be described with reference to the flowcharts of FIGS. 2, 3, and 4 and the timing charts of FIGS. 6 and 7.

Figure 5:
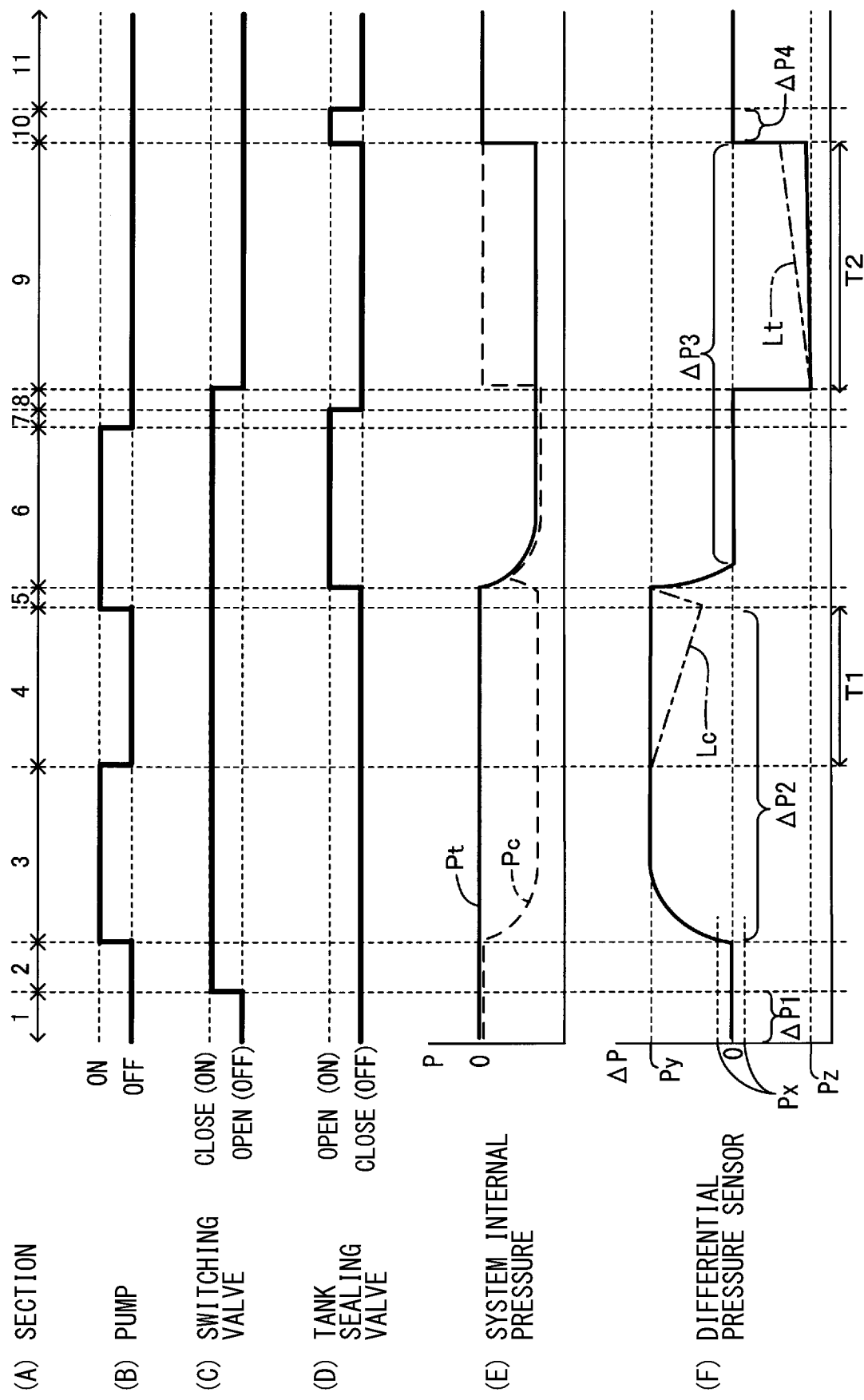
FIG. 5 is a timing chart.

FIG. 5 shows a timing chart when a differential pressure $\Delta P1$, which is the system differential pressure $\Delta P$ during an initial state, is 0. FIG. 6 shows a timing chart when the differential pressure $\Delta P1$ is a negative value. FIG. 7 shows a timing chart when the differential pressure $\Delta P1$ is a positive value. In the following description of the leakage diagnosis, the timing chart of FIG. 5 is generally referred to, and the timing charts of FIGS. 6 and 7 are referred to when appropriate.

Figure 2:
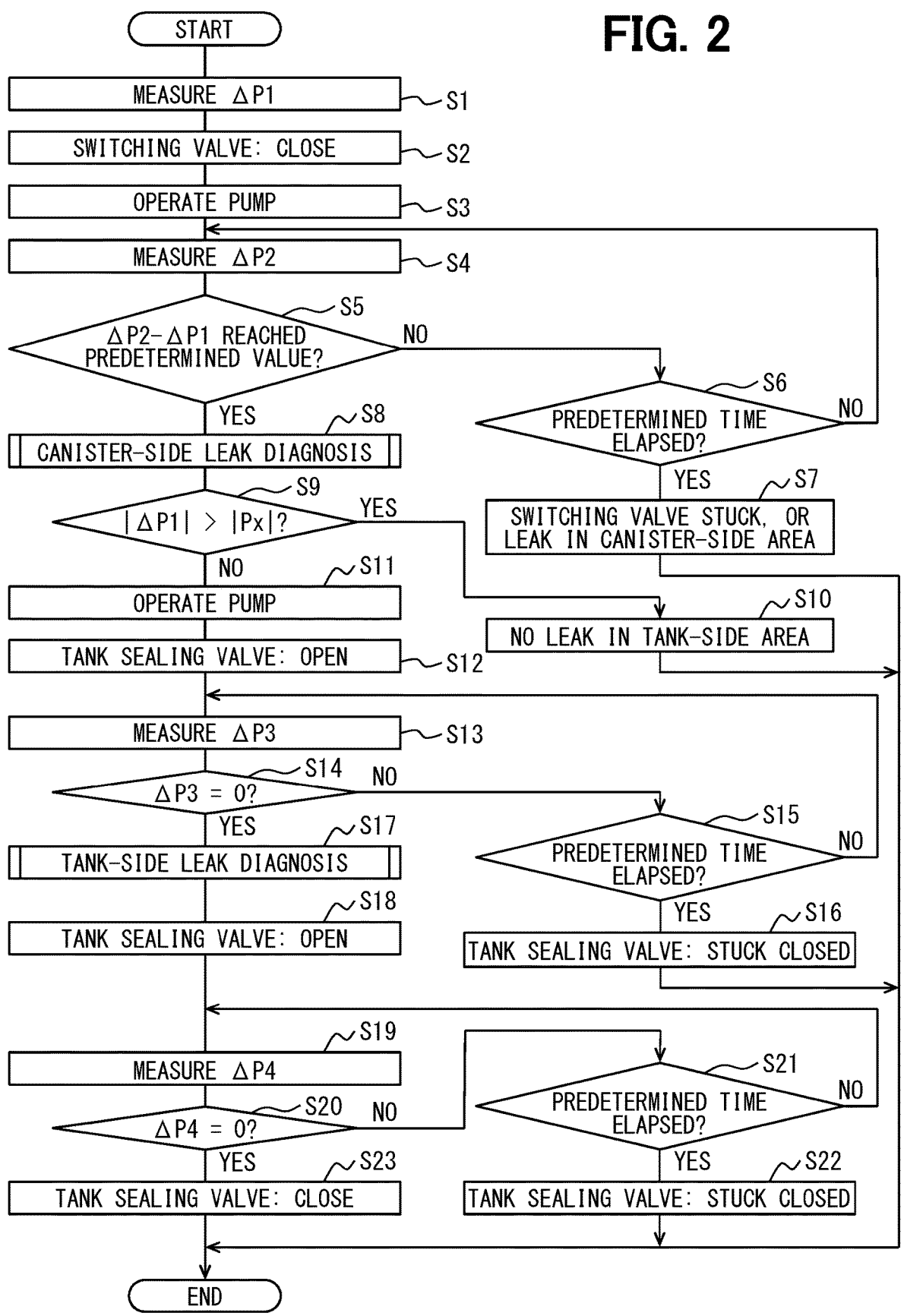
FIG. 2 is a flowchart of a leak diagnosis.

First, in step S1 shown in FIG. 2, the differential pressure sensor 7 measures the differential pressure $\Delta P1$, i.e., the system differential pressure $\Delta P$ in an initial state. In the present embodiment, the differential pressure sensor 7 outputs the system differential pressure $\Delta P$ as value obtained by subtracting the pressure in the canister-side region from the pressure in the tank-side region. Step S1 corresponds to the first section shown in FIG. 5(a), during which the pump 6 is stopped as shown in FIG. 5(b), the switching valve 5 is opened as shown in FIG. 5(c), and the tank sealing valve 4 is closed as shown in FIG. 5(d). Although not shown in FIG. 5, the purge valve 41 is assumed to be closed during the leak diagnosis.

Next, in step S2 of FIG. 2, the switching valve 5 is closed to shut off the connection between the canister 3 and the atmosphere. Step S2 corresponds to the second section shown in FIG. 5(a). Thereafter, in step S3, the pump 6 is operated. After step S3, the pump 6 is in operation, and a differential pressure $\Delta P2$ is measured by the differential pressure sensor 7 in step S4. Then, in step S5, it is determined whether or not $\Delta P2-\Delta P1$ has reached a predetermined value. The determination is performed in the leakage diagnosis unit 71. Steps S3 to S5 correspond to the third section shown in FIG. 5(a). In the third section, the canister-side region pressure Pc is reduced as shown in FIG. 5(e), and the system differential pressure $\Delta P$ output by the differential pressure sensor 7 is increased as shown in FIG. 5(f).

If it is determined in step S5 that $\Delta P2-\Delta P1$ has not reached the predetermined value, the process proceeds to No in step S5, and in step S6, it is determined whether a predetermined period has elapsed. If it is determined that the predetermined period has not elapsed, the process returns to step S4 again. Conversely, if it is determined in step S6 that the predetermined period has elapsed, it is determined in step S7 that either the switching valve 5 is stuck in an open state or there is a leak in the canister-side region, and the diagnosis is terminated.

If it is determined in step S5 that $\Delta P2-\Delta P1$ has reached the predetermined value, the leakage diagnosis unit 71 performs a canister side leakage diagnosis in step S8. Step S8 corresponds to the fourth section shown in FIG. 5(a).

Figure 3:
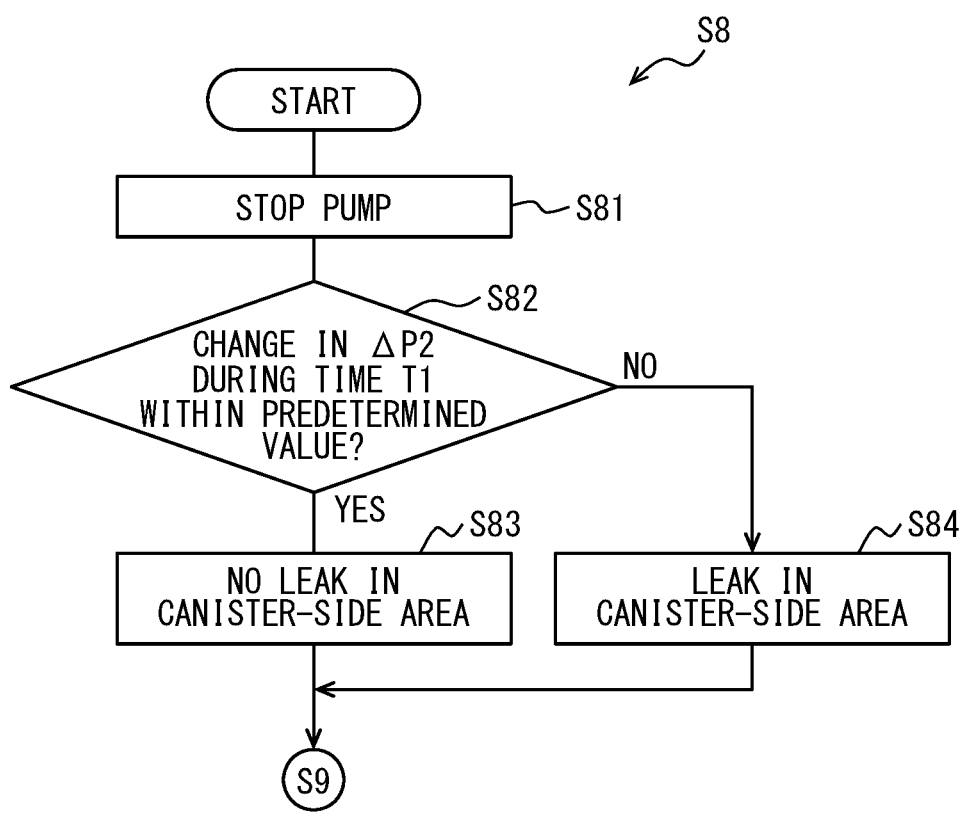
FIG. 3 is a flowchart of canister-side leak diagnosis.
Figure 4:
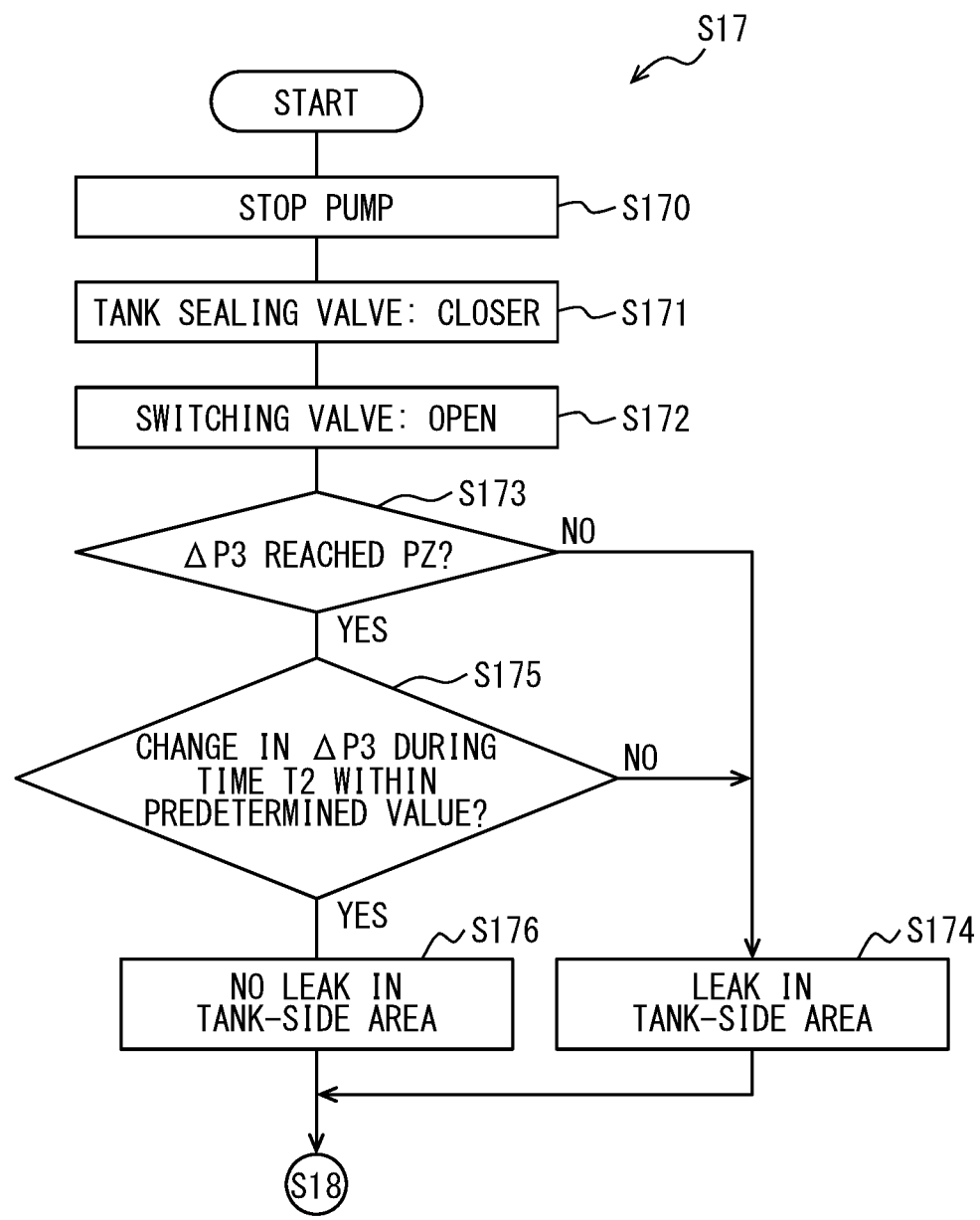
FIG. 4 is a flowchart of tank-side leak diagnosis.

As shown in FIG. 3, during the process of the canister side leakage diagnosis, first the pump 6 is stopped in step S81. In step S82, it is determined whether or not a change amount in the differential pressure $\Delta P2$ during a predetermined time period T1 is within a predetermined value. In step S82, when it is determined that the change amount in the differential pressure $\Delta P2$ is within the predetermined value as indicated by the solid line in the fourth section of FIG. 5(f), the process proceeds to Yes in step S82. Then, in step S83, it is determined that there is no leakage in the canister side area, and the process proceeds to step S9 in FIG. 2. Conversely, in step S82, when it is determined that the change amount in the differential pressure $\Delta P2$ is not within the predetermined value as indicated by the dotted line Lc in the fourth section of FIG. 5(f), the process proceeds to No in step S82. Then, in step S84, it is determined that there is a leakage in the canister side area, and the process proceeds to step S9 in FIG. 2. In the present embodiment, the determination of whether a value or a change in value is within a predetermined value may be performed by comparison with a preset threshold.

Then, after the canister side leakage diagnosis in step S8 of FIG. 2 is completed, it is determined in step S9 whether or not the absolute value of the differential pressure $\Delta P1$ in the initial state is greater than the absolute value of a predetermined value Px. In Step S9, when it is determined that the absolute value of the differential pressure $\Delta P1$ is larger than the absolute value of the predetermined value Px as shown in FIG. 7(f), the process proceeds to Yes in Step S9. The differential pressure $\Delta P1$ is a differential pressure during an initial state in which the switching valve 5 is open and the canister-side region is at atmospheric pressure. Accordingly, if the absolute value of the differential pressure $\Delta P1$ during the initial state is larger than the absolute value of the predetermined value Px as shown in FIG. 7(f), it is determined in step S10 that there is no leakage in the tank side area without needing to depressurize the tank side area with the pump 6. In this case, the switching valve 5 is opened and the process is finished.

Conversely, in Step S9, when it is determined that the absolute value of the differential pressure $\Delta P1$ is not larger than the absolute value of the predetermined value Px as shown in FIG. 5(f), the process proceeds to No in Step S9 of FIG. 2. Then, in step S11, the pump 6 is operated. Step S11 corresponds to the fifth section shown in FIG. 5(a). In step S12 of FIG. 2, the tank sealing valve 4 is opened to allow communication between the tank-side region and the canister-side region. Step S12 corresponds to the sixth section shown in FIG. 5(a). Thereafter, in step S13, a differential pressure $\Delta P3$ is measured by the differential pressure sensor 7. Then, in step S14, it is determined whether $\Delta P3=0$. The determination is performed by the leakage diagnosis unit 71. Steps S13 and S14 also correspond to the sixth section shown in FIG. 5(a).

If it is determined in step S14 that ΔP3=0 is not satisfied, the process proceeds to No in step S14. Thereafter, in step S15, it is determined whether or not a predetermined period has elapsed. If it is determined in step S15 that the predetermined period has not elapsed, the process returns to step S13 again. On the other hand, if it is determined in step S15 that the predetermined period has elapsed, the process proceeds to Yes in step S15, and in step S16, it is determined that the tank sealing valve 4 is stuck in a closed state, and the process ends.

If it is determined in step S14 that ΔP3=0, a tank side leakage diagnosis is performed by the leakage diagnosis unit 71 in step S17. As shown in FIG. 4, during the tank-side leakage diagnosis process, first the pump 6 is stopped in step S170. Step S170 corresponds to the seventh section shown in FIG. 5(a). Next, in step S171, the tank sealing valve 4 is closed to block communication between the tank-side region and the canister-side region. Step S171 corresponds to the eighth section shown in FIG. 5(a). Then, in step S172, the switching valve 5 is opened to allow communication between the canister-side region and open air.

Thereafter, in step S173, it is determined whether or not the value of the differential pressure ΔP3 has reached a predetermined value Pz shown in FIG. 5(f) within a predetermined time period. When it is determined that the value of the differential pressure ΔP3 has not reached the predetermined value Pz within the predetermined time period, the process proceeds to No in step S173. Then, in step S174, it is determined that there is a leak in the tank-side region, and the process proceeds to step S18 in FIG. 2.

Conversely, when it is determined in step S173 that the value of the differential pressure ΔP3 has reached the predetermined value Pz, the process proceeds to Yes in step S173. Then in step S175, it is determined whether a change amount of the differential pressure ΔP3 within a predetermined time period T2 is within a predetermined value. In step S175, when it is determined that the change amount in the differential pressure ΔP3 is within the predetermined value as indicated by the solid line in the ninth section of FIG. 5(f), the process proceeds to Yes in step S175. Then, in step S176, it is determined that there is no leakage in the tank side area, and the process proceeds to step S18 in FIG. 2. Conversely, in step S175, when it is determined that the change amount in the differential pressure ΔP3 is not within the predetermined value during the predetermined time period T2 as indicated by the dotted line Lt in the ninth section of FIG. 5(f), the process proceeds to No in step S175. Then, in step S174, it is determined that there is a leakage in the tank side area, and the process proceeds to step S18 in FIG. 2.

In step S18, the tank sealing valve 4 is opened, and in step S19, a differential pressure ΔP4 is measured by the differential pressure sensor 7. Then, in step S20, it is determined whether ΔP4=0. The determination is performed by the leakage diagnosis unit 71. Step S18, step S19 and step S20 correspond to the tenth section in FIG. 5(a).

If it is determined in step S20 that ΔP4=0 is not satisfied, the process proceeds to No in step S20. Thereafter, in step S21, it is determined whether or not a predetermined period has elapsed. If it is determined in step S21 that the predetermined period has not elapsed, the process returns to step S19 again. On the other hand, if it is determined in step S21 that the predetermined period has elapsed, the process proceeds to Yes in step S21, and in step S22, it is determined that the tank sealing valve 4 is stuck in a closed state, and the process ends. If it is determined in step S20 that ΔP4=0, the process proceeds to step S23, the tank sealing valve 4 is closed, and the process ends.

Next, the effects of this embodiment are explained.

First, to more clearly understand the effects of the present embodiment, consider a comparative example evaporated fuel treatment device that examines a change in internal pressure of a diagnostic target device after pressurizing a diagnostic target device including a fuel tank and a canister, and based on this, diagnoses leakage of evaporated fuel in the diagnostic target system. In the comparative example device, as sensors for detecting the change in the internal pressure of the diagnosis target system, a tank pressure sensor is provided in the fuel tank and an evaporation pressure sensor is provided in a purge passage connected to the canister. A tank sealing valve is provided in the passage connecting the fuel tank to the canister. With this configuration, in the comparative example diagnosis target system, the internal pressures of the fuel tank-side region and the canister-side region with respect to the tank sealing valve are detected, thereby making it possible to identify the area of any leaks that occur.

In the above-described comparative example leak diagnosis device, the pressures in the tank-side region and the canister-side region in the diagnosis target system are detected and compared to make it easy to identify the leak location. However, since two pressure sensors are provided, the number of components is high, and it may be desirable to provide an evaporated fuel processing device capable of reducing the number of components.

In the evaporated fuel processing device 1 of the present embodiment, the differential pressure between the tank-side region and the canister-side region in the detection target system is detected by a single differential pressure sensor 7. The detection result can be used for leakage diagnosis of the detection target system, state diagnosis of the tank sealing valve 4 and switching valve 5, operation control, and the like. Therefore, the number of components can be reduced as compared with the case where respective pressure sensors are provided in each of the tank-side region and the canister-side region in the detection target system.

Moreover, according to the present embodiment, the leakage diagnosis unit 71 is provided to perform the leak diagnosis in the detection target system based on the system pressure difference ΔP detected by the differential pressure sensor 7. As a result, the leakage diagnosis of the detection target system can be performed based on the system differential pressure ΔP.

Further, according to the present embodiment, the differential pressure sensor 7 is configured to detect a differential pressure ΔP1 that is a differential pressure in the system when the switching valve 5 is opened and the tank sealing valve 4 is closed. Based on the differential pressure ΔP1, the leakage diagnosis unit 71 performs a leak diagnosis of the tank-side region on the fuel tank 2 side of the tank sealing valve 4 in the detection target system. As a result, the leak diagnosis of the tank-side region can be performed by one differential pressure sensor 7.

Further, according to the present embodiment, when the absolute value of the differential pressure ΔP1 is larger than the absolute value of the predetermined value Px, it is determined that there is no leakage in the tank-side region. As a result, the leak diagnosis of the tank-side region can be performed quickly, and the time required for the leak diagnosis can be greatly reduced.

Further, according to the present embodiment, the detection target system is provided with the pump 6 that is arranged on the open air side of the canister 3 and pressurizes or depressurizes the detection target system. The differential pressure sensor 7 is configured to detect the differential pressure ΔP2, which is a differential pressure in the system after the switching valve 5 is closed, the tank sealing valve 4 is closed, and the pump 6 is operated. Then, based on whether or not the differential pressure ΔP2 reaches a predetermined value, or based on a change in the differential pressure ΔP2 during the predetermined time period T1 after the pump 6 is stopped, the leakage diagnosis unit 71 performs a leak diagnosis of the canister side area on the canister 3 side of the tank sealing valve 4 in the target system. As a result, the leak diagnosis of the canister-side region can be performed by one differential pressure sensor 7. Further, according to the present embodiment, as the determination of whether or not the differential pressure ΔP2 has reached the predetermined value, it is determined whether or not the value of the differential pressure ΔP2-ΔP1 has reached a predetermined value.

Further, according to the present embodiment, the detection target system is provided with the pump 6 that is arranged on the open air side of the canister 3 and pressurizes or depressurizes the detection target system. The differential pressure sensor 7 is configured to detect the differential pressure ΔP3, which is a differential pressure in the system after the switching valve 5 is closed, the tank sealing valve 4 is opened, and the pump 6 is operated. Then, the leakage diagnosis unit 71 performs the leakage diagnosis of the tank-side region on the fuel tank 2 side of the tank sealing valve 4 in the detection target system, based on whether or not the differential pressure ΔP3 has reached a predetermined value, or based on a change in the differential pressure ΔP3 during the predetermined time period T2 after the pump 6 is operated for a predetermined period then stopped, the tank sealing valve is closed and the switching valve 5 is opened. As a result, the leak diagnosis of the tank-side region can be performed by one differential pressure sensor 7.

Further, according to the present embodiment, the differential pressure ΔP4 is set to 0 in step S24 after the tank-side leakage diagnosis in step S21 of FIG. 2. As a result, the internal pressure of the fuel tank 2 is set to atmospheric pressure, the generation of evaporated fuel in the fuel tank 2 can be suppressed, and fuel consumption can be improved.

Figure 8:
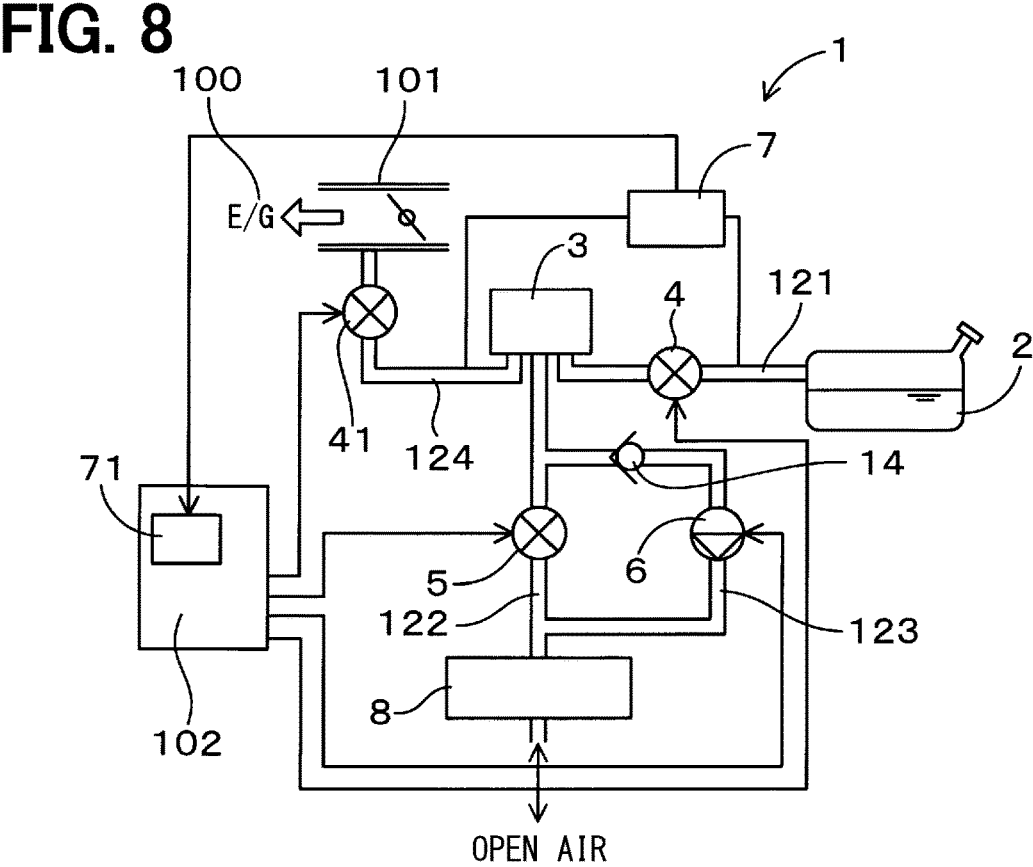
FIG. 8 is view showing the configuration an evaporated fuel processing device.

Further, in the present embodiment, the differential pressure sensor 7 is installed in the evaporated fuel passage 121 such that the tank sealing valve 4 is between the two connection points of the differential pressure sensor 7. In an alternative embodiment, as shown in the first modification shown in FIG. 8, the differential pressure sensor 7 may be installed so as to connect between the tank sealing valve 4 and the fuel tank 2 in the evaporated fuel passage 121 and between the canister 3 and the purge valve 41 in the purge passage 124. In this case, the same effects as those of the first embodiment are obtained.

Figure 9:
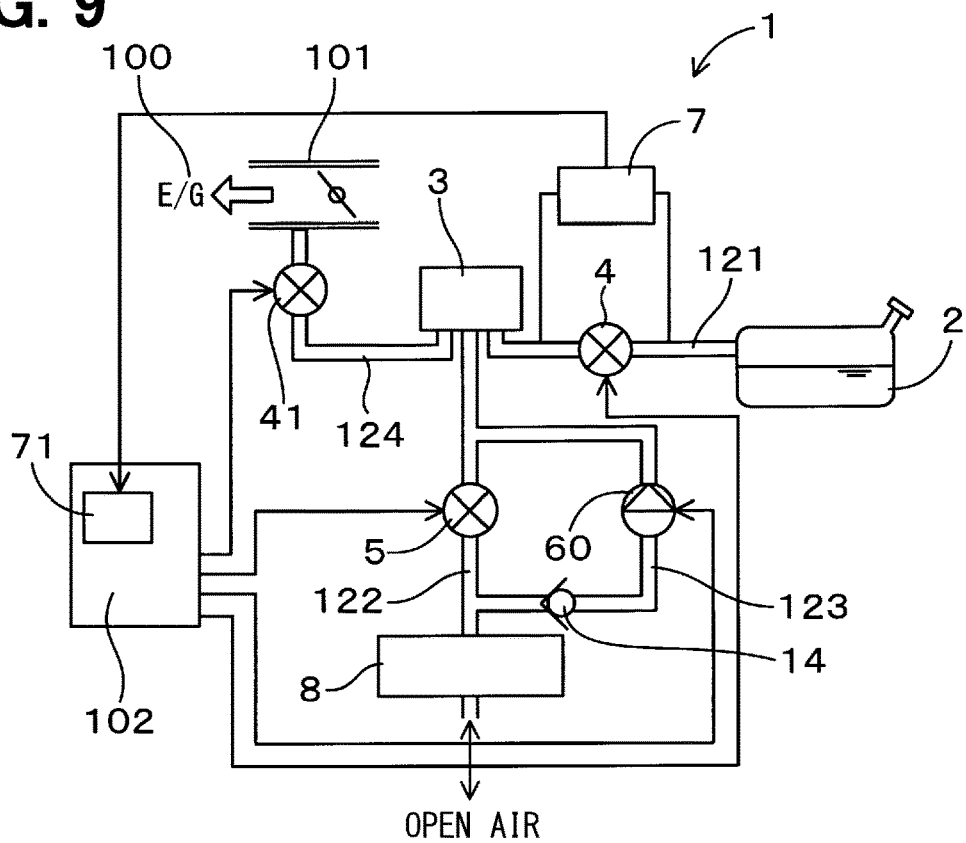
FIG. 9 is view showing the configuration an evaporated fuel processing device.

Further, in the present embodiment, a pressure reducing pump is used as the pump 6. As an alternative, a pressure increasing pump may be used as a pump 60. In this case, as shown in a second modification shown in FIG. 9, a check valve 14 is provided in the bypass passage 123 and installed on the air filter 8 side of the pump 60. In any case, the check valve 14 can prevent pressure from escaping through gaps in the pumps 6 and 60 after the pressure reduction by the pump 6 or the pressure increase by the pump 60.

Figure 10:
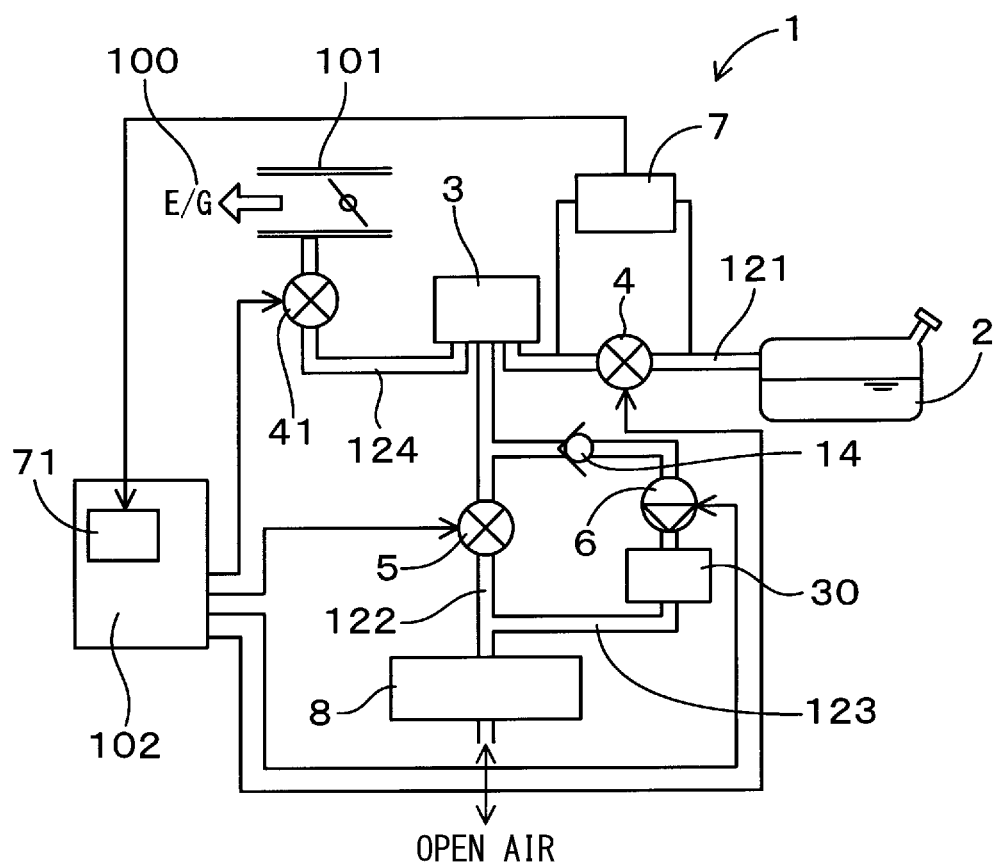
FIG. 10 is view showing the configuration an evaporated fuel processing device.

Further, as in the third modification shown in FIG. 10, a sub-canister 30 may be provided on the air filter 8 side of the bypass passage 123 in addition to the canister 3. In this case, the evaporated fuel can be adsorbed by the sub-canister 30 when a failure occurs in the canister 3. Since the sub-canister 30 is provided in the bypass passage 123, an increase in ventilation resistance in the vent passage 122 can be avoided.

Further, a filter containing activated carbon may be used as the air filter 8. In this case, the evaporated fuel that has reached the air filter 8 can be adsorbed by the air filter 8 to prevent the evaporated fuel from being released into the atmosphere.

As described above, according to the present embodiment and the various modifications, it is possible to provide the evaporated fuel processing device 1 capable of reducing the number of components.

The present disclosure is not limited to the embodiment and modifications described above, and various modifications may be adopted within the scope of the present disclosure without departing from the spirit of the disclosure.

The invention claimed is:

1. An evaporated fuel processing device for recovering evaporated fuel from a fuel tank of an internal combustion engine, comprising:
   a fuel tank which stores fuel;
   a canister that adsorbs the evaporated fuel generated in the fuel tank;
   a tank sealing valve that switches between allowing and blocking communication between the fuel tank and the canister;
   a switching valve that switches between allowing and blocking communication between the canister and open air; and
   a differential pressure sensor configured to detect a system differential pressure of a detection target system including the canister and the fuel tank, the system differential pressure being a pressure difference between a pressure on the canister side of the tank sealing valve and a pressure on the fuel tank side of the tank sealing valve.

2. The evaporated fuel processing device according to claim 1, further comprising:
   a leakage diagnosis unit configured to perform a leakage diagnosis in the detection target system based on the system differential pressure.

3. The evaporated fuel processing device according to claim 2, wherein
   the differential pressure sensor is configured to detect a differential pressure ΔP1, the differential pressure ΔP1 being the system differential pressure while the switching valve is open and the tank sealing valve is closed, and
   the leakage diagnosis unit is configured to, based on the differential pressure ΔP1, perform a leakage diagnosis for a tank-side region of the detection target system, the tank-side region being on the fuel tank side of the tank sealing valve.

4. The evaporated fuel processing device according to claim 2, further comprising:
   a pump disposed on the open air side of the canister within the detection target system, the pump being configured to pressurize or depressurize the detection target system, wherein
   the differential pressure sensor is configured to detect a differential pressure ΔP2, the differential pressure ΔP2 being the system differential pressure after the switching valve is closed, the tank sealing valve is closed, and the pump is operated, the leakage diagnosis unit is configured to perform a leakage diagnosis for a canister-side region of the detection target system based on:
- whether the differential pressure ΔP2 has reached a predetermined value, or
- a change in the differential pressure ΔP2 during a predetermined time period after the pump is stopped, and the canister-side region is a region on the canister side of the tank sealing valve.

5. The evaporated fuel processing device according to claim 2, further comprising:

a pump disposed on the open air side of the canister within the detection target system, the pump being configured to pressurize or depressurize the detection target system, wherein the differential pressure sensor is configured to detect a differential pressure ΔP3, the differential pressure ΔP3 being the system differential pressure after the pump is operated while the switching valve is closed and the tank sealing valve is open, the leakage diagnosis unit is configured to perform a leakage diagnosis for a tank-side region of the detection target system based on:
- whether the differential pressure ΔP3 has reached a predetermined value, or
- a change in the differential pressure ΔP3 during a predetermined time period after the pump is operated for a preset period, the pump is stopped, and then the tank sealing valve is closed and the switching valve is opened, and the tank-side region is a region on the fuel tank side of the tank sealing valve.

6. An evaporated fuel processing device for recovering evaporated fuel from a fuel tank of an internal combustion engine, comprising:

a fuel tank which stores fuel;

a canister that adsorbs the evaporated fuel generated in the fuel tank;

a tank sealing valve that switches between allowing and blocking communication between the fuel tank and the canister;

a switching valve that switches between allowing and blocking communication between the canister and open air;

a differential pressure sensor configured to detect a system differential pressure of a detection target system including the canister and the fuel tank, the system differential pressure being a pressure difference between a pressure on the canister side of the tank sealing valve and a pressure on the fuel tank side of the tank sealing valve; and a processor coupled to the differential pressure sensor programmed to perform a leakage diagnosis in the detection target system based on the system differential pressure received from the differential pressure sensor.

7. The evaporated fuel processing device according to claim 6, wherein the differential pressure sensor is configured to detect a differential pressure ΔP1, the differential pressure ΔP1 being the system differential pressure while the switching valve is open and the tank sealing valve is closed, and the processor is programmed to determine, based on the differential pressure ΔP1, whether a leak has occurred in a tank-side region of the detection target system, the tank-side region being on the fuel tank side of the tank sealing valve.

8. The evaporated fuel processing device according to claim 6, further comprising:

a pump disposed on the open air side of the canister within the detection target system, the pump being configured to pressurize or depressurize the detection target system, wherein the differential pressure sensor is configured to detect a differential pressure ΔP2, the differential pressure ΔP2 being the system differential pressure after the switching valve is closed, the tank sealing valve is closed, and the pump is operated, the processor is programmed to:
- determine whether the differential pressure ΔP2 has reached a predetermined value, and
- determine whether a leak has occurred in a canister-side region of the detection target system on the canister side of the tank sealing valve based on whether the differential pressure ΔP2 has reached the predetermined value.

9. The evaporated fuel processing device according to claim 6, further comprising:

a pump disposed on the open air side of the canister within the detection target system, the pump being configured to pressurize or depressurize the detection target system, wherein the differential pressure sensor is configured to detect a differential pressure ΔP2, the differential pressure ΔP2 being the system differential pressure after the switching valve is closed, the tank sealing valve is closed, and the pump is operated, the processor is programmed:
- monitor the differential pressure ΔP2 for a predetermined time period after the pump is stopped, and
- determine whether a leak has occurred in a canister-side region of the detection target system on the canister side of the tank sealing valve based on whether a change in the differential pressure ΔP2 during the predetermined time period is under a predetermined threshold.

10. The evaporated fuel processing device according to claim 6, further comprising:

a pump disposed on the open air side of the canister within the detection target system, the pump being configured to pressurize or depressurize the detection target system, wherein the differential pressure sensor is configured to detect a differential pressure ΔP3, the differential pressure ΔP3 being the system differential pressure after the pump is operated while the switching valve is closed and the tank sealing valve is open, the processor is programmed to:
- determine whether the differential pressure ΔP3 has reached a predetermined value, and
- determine whether a leak has occurred in a tank-side region of the detection target system on the fuel tank side of the tank sealing valve based on whether the differential pressure ΔP3 has reached the predetermined value.

11. The evaporated fuel processing device according to claim 6, further comprising:

a pump disposed on the open air side of the canister within the detection target system, the pump being configured to pressurize or depressurize the detection target system, wherein the differential pressure sensor is configured to detect a differential pressure ΔP3, the differential pressure ΔP3 being the system differential pressure after the pump is operated while the switching valve is closed and the tank sealing valve is open, the processor is programmed to:
- control the pump to operate for a preset period then stop the pump,
- after stopping the pump, controlling the tank sealing valve to close and the switching valve to open,
- after controlling the tank sealing valve and the switching valve, monitor the differential pressure ΔP3 for a predetermined time period, and
- determine whether a leak has occurred in a tank-side region of the detection target system on the fuel tank side of the tank sealing valve based on whether a change in the differential pressure ΔP3 during the predetermined time period is under a predetermined threshold.

* * * * *